Nov. 15, 1955 R. H. GRIEST 2,723,565
MULTIPLYING LEVER FOR INDICATING DISPLACEMENT
Filed Dec. 23, 1952
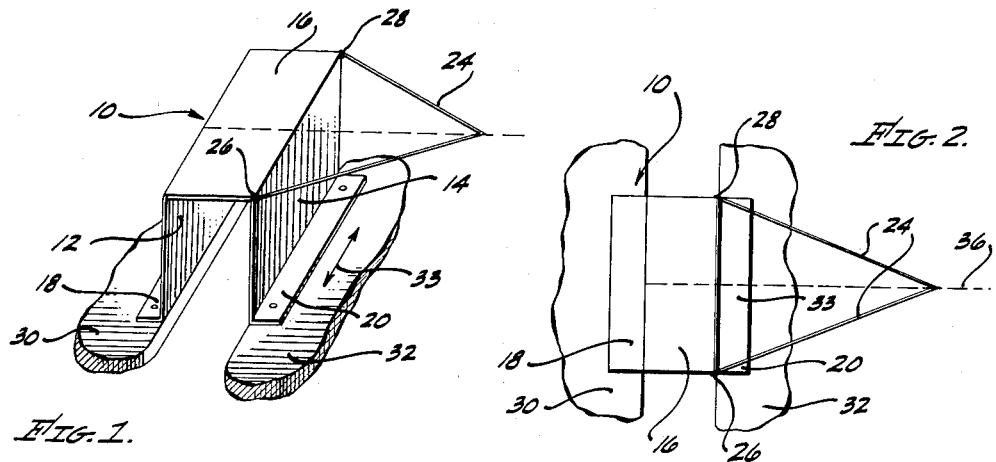
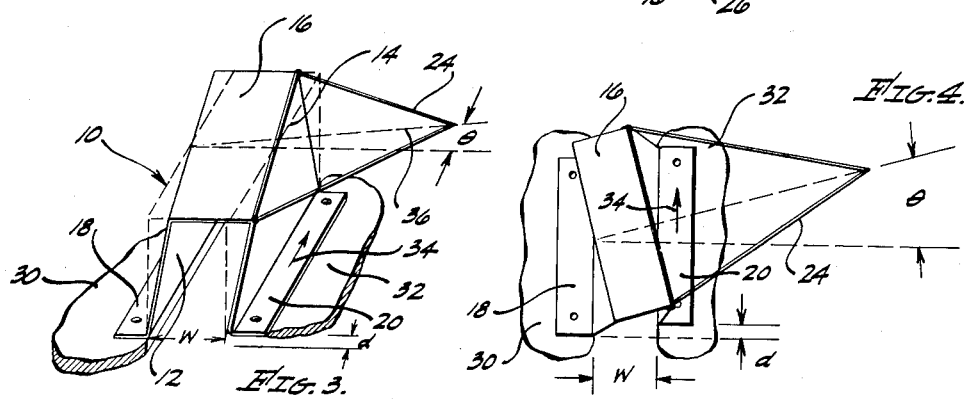
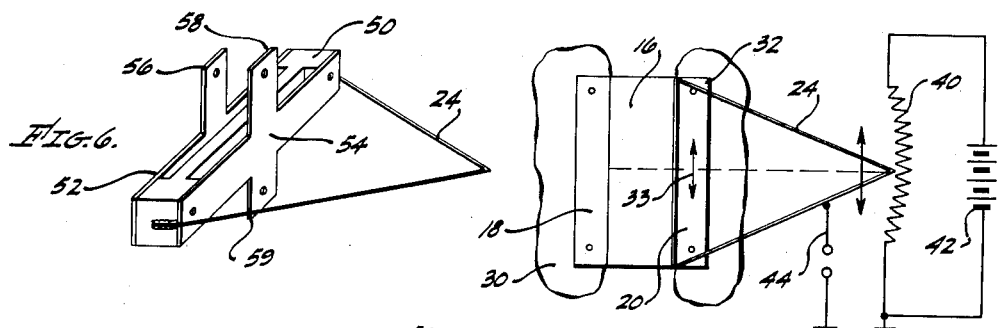
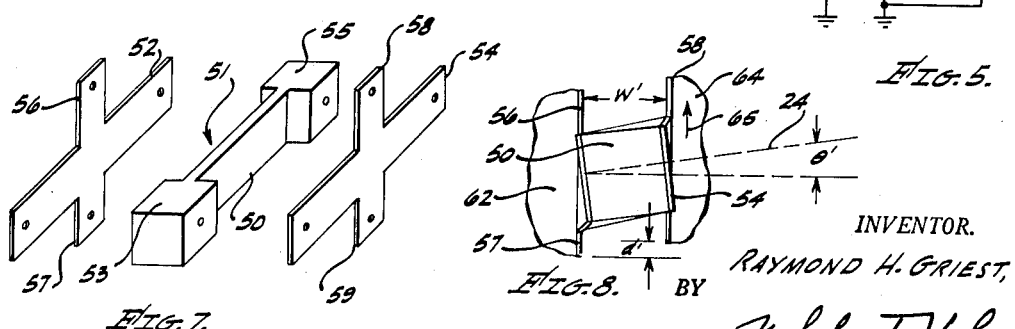
INVENTOR.
RAYMOND H. GRIEST,
BY Nicholas T. Vohx
ATTORNEY.

United States Patent Office 2,723,565
Patented Nov. 15, 1955

2,723,565

MULTIPLYING LEVER FOR INDICATING DISPLACEMENT

Raymond Howard Griest, Los Angeles, Calif., assignor, by mesne assignments, to Hughes Aircraft Company, a corporation of Delaware Application December 23, 1952, Serial No. 327,555

5 Claims. (Cl. 73—432)

This invention relates to mechanical indicating mechanisms, and more particularly to a lever of the multiplying type suitable, for example, for obtaining relatively large indications of small motions of a movable or vibratory body.

It has been found desirable in many instances to provide mechanical mechanisms suitable, for example, for indicating the effect on delicate parts, such as electrical measuring instruments, of vibratory motion of a structure which supports such instruments. Such an indicating mechanism may be employed, for example, to obtain data which may be used to determine how the mounting of the structure may best be modified to insure minimum vibrational movement thereof. Such an indicating mechanism may also be employed to respond to physical movements of such delicate instruments by developing damping forces substantially instantaneously upon the occurrence of such movements to react upon the instrument thus reduce or damp undesired motions to a minimum. It is necessary, under such circumstances, that the means employed for magnifying such small mechanical motions be free from backlash.

The present invention specifically relates to a simple lever construction including a pointer which will have relatively large physical movement, with substantially no backlash, in response to very small motions of a movable body to which the lever is connected. A preferred embodiment of a lever mechanism in accordance with this invention comprises a channel-shaped flexible element having flanges provided with two coplanar flared portions. The two flared portions of the flanges are adapted to be secured, respectively, to a movable structure and to a fixed reference structure. A pointer, which may comprise a stiff wire, is bent intermediate its ends at an acute angle and has its ends secured to the opposite ends of the web of the channel-shaped element. Upon motion of the movable structure within the plane of the flared portion of the flange affixed thereto, the portions of the flanges extending between the web and the flared portions will be distorted so as to permit the web to rotate. The pointer moves with the web and its intermediate portion moves over a relatively large distance compared to the movement of the movable structure.

It is, therefore, an object of this invention to provide an extremely simple lever of the multiplying type capable of magnifying small motions of a portion thereof without backlash.

It is another object of this invention to provide a multiplying type lever comprising a pair of spaced, parallel, flexible elements adapted to be secured, respectively, to a movable structure and to a fixed structure, means providing mechanical linkage between the flexible elements, and a pointer element affixed to such linkage means and adapted to move through a relatively great distance in response to small motions of the movable structure with respect to the fixed structure.

It is a further object of this invention to provide a multiplying lever having a minimum number of component parts which is of simple construction and capable of reliable operation for accurately magnifying small motions of certain portions thereof.

The novel features which are believed to be characteristic of the invention, both as to its organization and method of operation, together with further objects and advantages thereof, will be better understood from the following description considered in connection with the accompanying drawing, in which different embodiments of the invention are illustrated by way of example only, and the scope of the invention is pointed out in the appended claims. In the drawing:

Fig. 1 is a perspective view of a simple lever construction in accordance with this invention;

Fig. 2 is a top plan view of the lever of Fig. 1;

Fig. 3 is a perspective view similar to Fig. 1, showing the action of the lever of the invention in response to a motion of a portion thereof;

Fig. 4 is a top plan view of the lever in the position shown in Fig. 3;

Fig. 5 is a top plan view of the lever of Fig. 1, in an arrangement to illustrate a practical use of the indicator of this invention;

Fig. 6 is a perspective view of a modified version of the lever of Fig. 1;

Fig. 7 is an exploded view showing the elements comprising the lever of Fig. 6; and Fig. 8 is a side elevation view of the lever of Fig. 6, illustrating its position in response to a small motion of a movable body to which it is connected.

Referring to the drawing, in which like reference characters indicate like elements throughout, and more particularly to Figs. 1 and 2, a preferred embodiment of the multiplying lever of this invention comprises a flexible, channel-shaped member 10 having flanges 12, 14 extending perpendicularly to or at right angles from a flat web or center portion 16. The channel member 10 may be formed from a sheet of any suitable flexible material, such as Phosphor bronze. The flanges 12, 14 have flared ends shown, by way of example, as flat, flared sections 18, 20 which "flare" or extend outwardly from the parallel portions of flanges 12, 14 in a common plane parallel to web 16. Affixed to the opposite ends of web 16 is a pointer element 24. Pointer 24 preferably comprises a wire that is bent in an acute angle at its center. The wire has its free ends affixed to web 16 in a suitable manner, such as by soldered connections provided at points 26, 28 at the corner between web 16 and flange 14. The pointer element could, of course, comprise a triangular sheet element having its base affixed to web 16.

As indicated in Figs. 1 and 2, the flared sections 18, 20 of flanges 12, 14 are adapted to be affixed, respectively, to a fixed structure 30 and to a movable structure 32. As indicated by an arrow 33, movable structure 32 is adapted for movement in opposite directions in the plane of flared section 20 and parallel to the edge of web 16. As will be explained more fully hereinafter in connection with Figs. 3 and 4, the pointer 24, by virtue of the construction of the lever above described, will be moved in a plane parallel to flared section 20 and through a considerable angle in response to very small motions of movable structure 32.

As will become more evident hereinafter, the flared sections 18, 20 are unnecessary to obtain wide movements of pointer 24 which correspond to relatively small motions of movable structure 32 in the manner above described. For example, flared sections 18, 20 could be eliminated and the free ends of flanges 12, 14 extending perpendicularly from web 16 could be secured, as by soldering, to the respective structures 30, 32.

Figs. 3 and 4 illustrate the effect of motion of structure 32 through a distance $d$ in the direction indicated by arrow 34, and in the plane of section 20. From their undistorted position, shown in dotted lines, the flanges 12, 14 tend to twist clockwise at their front ends and counterclockwise at their rear ends. The flanges 12, 14 remain substantially parallel, however, while the web 16 and the transverse center line 36, which passes through the vertex or pointer end of pointer 24, rotate counterclockwise about an axis normal to the plane of the web. As indicated, for a motion of structure 32 in the direction of arrow 34, which motion is counterclockwise with reference to the aforementioned center line, web 16 and pointer 24 also rotate counterclockwise. The actions above described are opposite for motions of movable structure 32 opposite to arrow 34.

It can be shown that for very small motions of movable structure 32 over a distance $d$, with respect to reference structure 30, and for a web 16 having a width $w$ that is great compared to the distance $d$, the free end of pointer 24 swings through an angle $\theta$ given by:

$$\sin \theta = \frac{d}{w}$$

Furthermore, for extremely small distances $d$, it may be assumed that $\sin \theta \approx \theta$ and hence:

$$\theta \approx \frac{d}{w}$$

Therefore, the movement of pointer 24 accurately corresponds to the distance $d$ through which movable structure 32 moves. The movement of pointer 24 magnifies the motion of movable structure 32 by a factor dependent upon the distance $d$. The distance through which the end of pointer 24 moves in response to a corresponding movement of structure 32 through distance $d$ depends upon the distance of the end of pointer 24 from web 16. Thus, with a sufficiently long pointer 24, sufficiently large movements may be obtained which may be easily measured, in a suitable manner, to determine the extent of the motion of structure 32 with respect to reference structure 30. Fig. 5 illustrates a preferred arrangement for obtaining an accurate measure of such movements.

Referring now to Fig. 5, the end of pointer 24 is employed as a sliding contact for a potentiometer resistor 40, which preferably is curved to correspond to the arc through which the pointer moves. The opposite ends of resistor 40 are connected to the positive and negative terminals of a suitable direct-current voltage source 42. The junction of the potentiometer resistor 40 and the negative terminal of source 42 may be connected to a point of reference potential, which is indicated as ground. An output voltage lead 44 is connected to pointer 24. Upon movement of pointer 24 in response to movements of structure 32 in the manner previously described, varying voltages are developed between voltage lead 44 and ground which accurately represent the deviation of pointer 24 and the motion of structure 32 from a fixed reference position. Accordingly, voltage indications of the movement of structure 32 are provided which may be utilized in a desired manner, for example, to provide a measure of the motion of structure 32 for test purposes in the manner previously indicated.

A second embodiment of a multiplying lever of the invention is illustrated in Figs. 6 through 8. Referring now to Figs. 6 and 7, a rigid I-beam member 50, which consists of an elongated web portion 51 and a pair of substantially cubical flanges 53, 55 at the opposite ends of web 51, provides support for a pair of flexible members 52, 54. Flexible members 52, 54 are equal in length to I-beam member 50 and extend between flanges 53, 55 on opposite sides of elongated web 51 thereof. Flexible members 52, 54 are suitably secured at their ends to the flanges 53, 55 as, for example, by suitable fastening means in aligned openings, so as to extend parallel to the web 51 of the beam 50, in the manner indicated in Fig. 6. A pointer 24 is affixed at its ends to the flanges 53, 55 so as to extend perpendicularly from flexible member 54.

Centrally located between the ends of flexible member 52 are oppositely extending or transverse finger sections 56, 57; similarly provided intermediate the ends of flexible member 54 are oppositely extending finger sections 58, 59.

Referring now to Fig. 8, which illustrates the motion or distortion of the lever of Figs. 6 and 7, finger sections 56, 57 are affixed to a reference or fixed structure 62 and the finger sections 58, 59 are affixed to a movable structure 64. Upon motion of movable structure 64 in the plane of finger sections 58, 59 of flexible member 64, as indicated by arrow 65, flexible members 52, 54 are distorted. This distortion takes the form of counterclockwise twisting of the portions of flexible members 52, 54 intermediate the respective finger sections 56, 57 and 58, 59 and the flanges 53, 55, so as to permit I-beam member 50 to turn slightly (counterclockwise in Fig. 8). In the manner described previously in connection with Figs. 2 and 3, the movement of pointer 24 magnifies the relatively small motion of movable structure 64. Hence, pointer 24 moves through an angle $\theta'$ in response to motions of movable structure 64 through small distances $d'$.

What is claimed is:

1. A multiplying lever comprising, in combination, a flexible channel-shaped member comprising a web portion extending between a pair of parallel flanges, a pointer element comprising a stiff wire bent at its center to form an acute angle, the ends of said wire being secured to opposite ends of said web portion and being disposed on opposite sides of a center line of said pointer, said pointer extending a predetermined distance from said web portion and in the plane thereof, said flanges being flexible, said flanges distorting upon a small movement of the free edge of one of said flanges parallel to and with respect to the free edge of the other of said flanges, said web portion rotating in a plane parallel to the path of movement of said free edge of said one of said flanges, said pointer rotating with said web portion, free end of said pointer moving through a distance that is a predetermined multiple of the small movement of the free edge of said one flange.

2. The lever defined in claim 1, in which said flanges extend perpendicularly from said web portion, and said flanges are coextensive.

3. The lever defined in claim 2, in which said flanges have flared terminal sections adapted for connection, respectively, to a reference structure and a movable structure, whereby small motions of the movable structure with respect to the reference structure and parallel to the flared section secured to the reference structure are magnified a predetermined amount by said pointer.

4. A lever arrangement comprising, in combination, a channel-shaped flexible member, said member having a rectangular web and a pair of parallel, coextensive flanges, said flanges extending from opposite edges of said web, said web having a predetermined width, a pointer comprising a length of stiff wire bent at its center, said pointer having its ends affixed to said web at its opposite ends, said flanges distorting upon the free edge of one of said flanges moving through a predetermined small distance parallel to and with respect to the other of said flanges, said flanges upon distorting permitting said web and said pointer to rotate through an angle substantially equal to the ratio of said predetermined distance to said predetermined width.

5. The lever defined in claim 4, in which the bent center portion of said pointer forms the sliding contact of a potentiometer, and a source of direct-current voltage, said source connected across said potentiometer, said pointer, upon relative movement between said flanges, being moved along said potentiometer, whereby a voltage representative of said motion exists at said pointer.

References Cited in the file of this patent

UNITED STATES PATENTS

| | | |
|---|---|---|
| 625,537 | Bristol | May 23, 1899 |
| 1,757,604 | Trumpler | May 6, 1930 |
| 2,139,251 | Aller | Dec. 6, 1938 |

FOREIGN PATENTS

| | | |
|---|---|---|
| 134,484 | Great Britain | Nov. 6, 1919 |